US012208608B2

(12) United States Patent
Morino et al.

(10) Patent No.: US 12,208,608 B2
(45) **Date of Patent: *Jan. 28, 2025**

(54) PRINTER

(71) Applicant: Ricoh Company, Ltd., Tokyo (JP)

(72) Inventors: Tetsu Morino, Kanagawa (JP); Muneyuki Okeguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,675

(22) Filed: Jun. 16, 2023

(65) Prior Publication Data

US 2023/0331010 A1 Oct. 19, 2023

Related U.S. Application Data

(63) Continuation of application No. 17/142,297, filed on Jan. 6, 2021, now Pat. No. 11,718,112.

(30) Foreign Application Priority Data

Jan. 29, 2020 (JP) ................................ 2020-012951

(51) Int. Cl.

*B41J 13/10* (2006.01)
*B41J 2/175* (2006.01)
*B41J 29/393* (2006.01)
*D06P 5/30* (2006.01)

(52) U.S. Cl.

CPC ............... *B41J 13/10* (2013.01); *B41J 2/175* (2013.01); *B41J 29/393* (2013.01); *D06P 5/30* (2013.01)

(58) Field of Classification Search

None

See application file for complete search history.

(56) References Cited

U.S. PATENT DOCUMENTS

| | | | | |
|---|---|---|---|---|
| 9,073,369 | B2 * | 7/2015 | Yanagishita | B41J 15/16 |
| 9,377,299 | B2 | 6/2016 | Fujimori et al. | |
| 11,718,112 | B2 * | 8/2023 | Morino | B41J 3/4078 347/19 |
| 2005/0194730 | A1 | 9/2005 | Nishida et al. | |
| 2008/0049087 | A1 | 2/2008 | Morino | |
| 2008/0225066 | A1 | 9/2008 | Yorimoto et al. | |
| 2008/0225067 | A1 | 9/2008 | Morino et al. | |
| 2008/0225068 | A1 | 9/2008 | Morino et al. | |
| 2008/0231649 | A1 | 9/2008 | Kawabata et al. | |
| 2008/0238959 | A1 | 10/2008 | Kato et al. | |

(Continued)

FOREIGN PATENT DOCUMENTS

| | | |
|---|---|---|
| JP | 2003-311938 A | 11/2003 |
| JP | 2008-246879 A | 10/2008 |

(Continued)

OTHER PUBLICATIONS

Office Action issued Oct. 24, 2023 in Japanese Patent Application No. 2020-012951, 8 pages.

*Primary Examiner* — Alejandro Valencia
(74) *Attorney, Agent, or Firm* — XSENSUS LLP

(57) ABSTRACT

A printer includes a liquid discharge head configured to discharge a liquid to a print target, a holder configured to hold the print target, and a height detector configured to detect the print target on the holder at a first height and at a second height lower than the first height.

10 Claims, 9 Drawing Sheets

(56) References Cited

U.S. PATENT DOCUMENTS

| | | | |
|---|---|---|---|
| 2008/0239051 | A1 | 10/2008 | Kato |
| 2009/0015621 | A1 | 1/2009 | Hirota et al. |
| 2009/0148181 | A1 | 6/2009 | Niihara et al. |
| 2009/0184993 | A1 | 7/2009 | Yorimoto et al. |
| 2009/0185813 | A1 | 7/2009 | Hagiwara et al. |
| 2009/0189937 | A1 | 7/2009 | Naruse et al. |
| 2010/0026742 | A1 | 2/2010 | Morino |
| 2010/0149299 | A1 | 6/2010 | Nishida et al. |
| 2010/0312443 | A1 | 12/2010 | Long |
| 2013/0057604 | A1 | 3/2013 | Masunaga et al. |
| 2013/0176367 | A1 | 7/2013 | Morino et al. |
| 2016/0136949 | A1 | 5/2016 | Kojima |
| 2016/0355007 | A1 | 12/2016 | Morino et al. |
| 2020/0290387 | A1 | 9/2020 | Morino et al. |
| 2020/0369032 | A1 | 11/2020 | Morino et al. |

FOREIGN PATENT DOCUMENTS

| | | | |
|---|---|---|---|
| JP | 2017-001366 | A | 1/2017 |
| JP | 2018-001715 | A | 1/2018 |
| JP | 2019-136999 | A | 8/2019 |
| JP | 2020-006541 | A | 1/2020 |

* cited by examiner

PRINTER

CROSS-REFERENCE TO RELATED APPLICATIONS

This patent application is a continuation of U.S. patent application Ser. No. 17/142,297, filed on Jan. 6, 2021, which claims priority pursuant to 35 U.S.C. § 119(a) to Japanese Patent Application No. 2020-012951, filed on Jan. 29, 2020, in the Japan Patent Office, the entire disclosures of each is hereby incorporated by reference herein.

BACKGROUND

Technical Field

Aspect of the present disclosure relates to a printer.

Related Art

A printer prints on a cloth such as a T-shirt, for example.

The printer includes a recording head to discharge an ink, a carriage mounting the recording head to move the recording head, a flexible detection plate on the carriage. The printer stops a movement of the carriage when the printer detects a displacement of the flexible detection plate by the flexible detection plate contacting a recording medium such as cloth.

SUMMARY

In an aspect of this disclosure, A printer includes a liquid discharge head configured to discharge a liquid to a print target, a holder configured to hold the print target, and a height detector configured to detect the print target on the holder at a first height and at a second height lower than the first height.

In another aspect of this disclosure, a method for controlling a printer includes discharging a liquid to a print target, holding the print target on a holder, and detecting the print target on the holder at a first height and at a second height lower than the first height.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
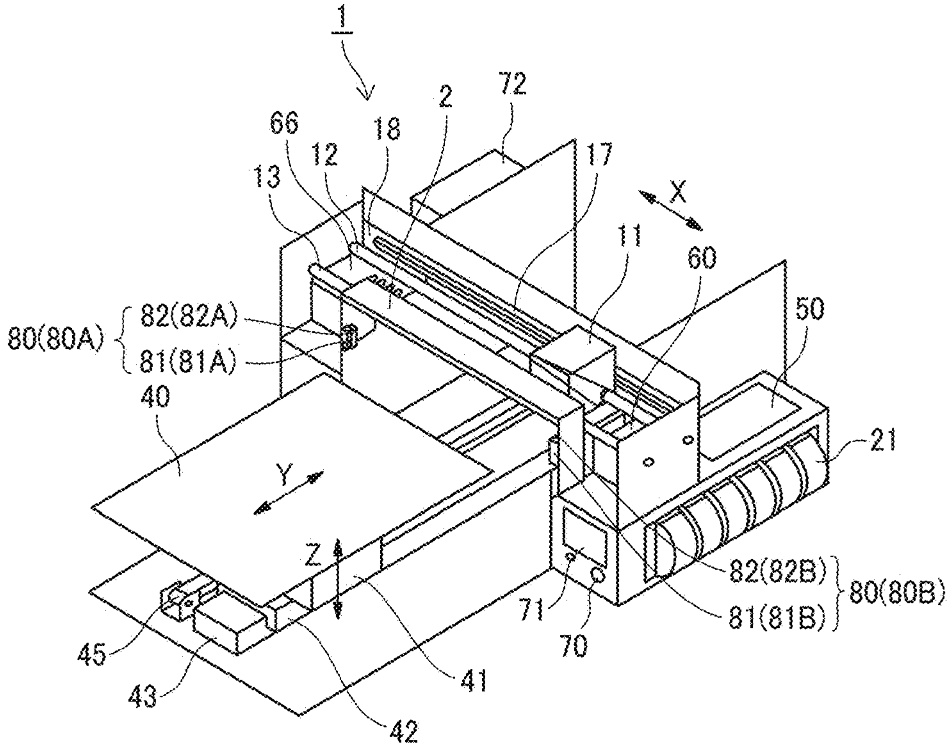
FIG. 1 is a schematic perspective view of a printer according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a," "an," and "the" are intended to include the plural forms as well, unless the context clearly indicates otherwise.

Referring now to the drawings, wherein like reference numerals designate identical or corresponding parts throughout the several views, embodiments of the present disclosure are described below. A printer 1 according to a first embodiment of the present disclosure is described with reference to FIGS. 1 to 3.

FIG. 1 is a schematic perspective view of the printer 1 according to the first embodiment.

Figure 2:
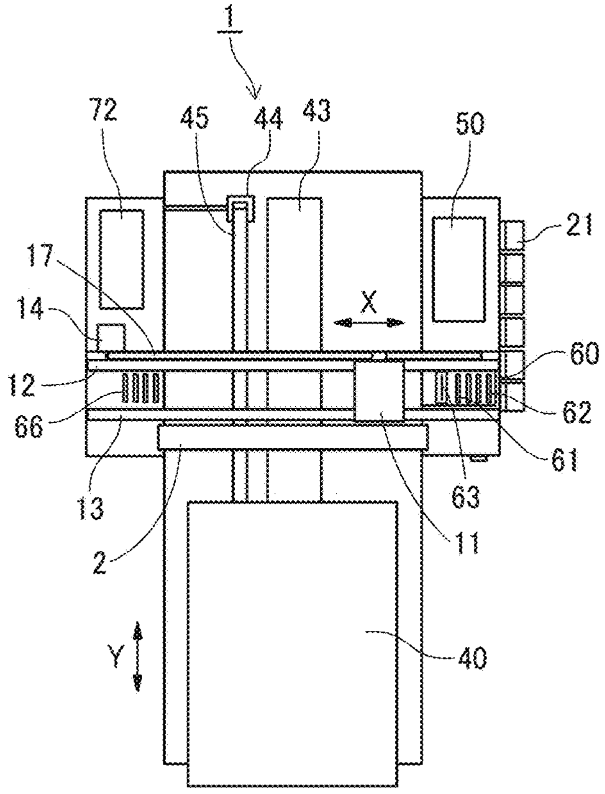
FIG. 2 is a schematic plan view of the printer of FIG. 1.

FIG. 2 is a schematic plan view of the printer 1 of FIG. 1.

Figure 3:
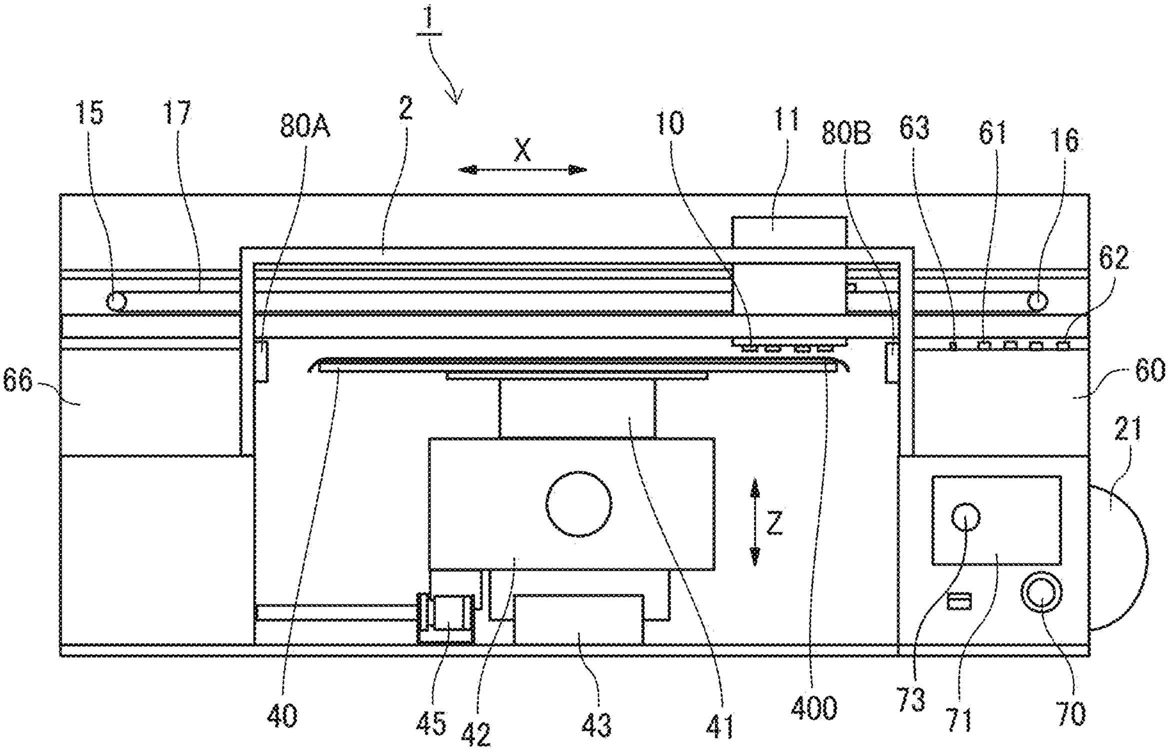
FIG. 3 is a schematic cross-sectional front view of the printer of FIG. 1.

FIG. 3 is a schematic cross-sectional front view of the printer of FIG. 1.

The printer 1 includes one or a plurality of heads 10 to discharge a liquid and a carriage 11 mounting the one or the plurality of heads 10. Hereinafter, the "one or the plurality of heads" is simply referred to as a "head." The guides 12 and 13 holds the carriage 11 such that the carriage 11 is reciprocally movable in a main scanning direction indicated by arrow "X" in FIG. 1. To move and scan the carriage 11 in the main scanning direction X, a timing belt 17 is stretched between a drive pulley 15 rotated by a main-scanning motor 14 and a driven pulley 16. As the main-scanning motor 14 drives and rotates the timing belt 17 through the drive pulley 15, the timing belt 17 reciprocally moves the carriage 11 in the main scanning direction X.

The printer 1 includes an encoder sheet 18 arranged along the main scanning direction X. The encoder sheet 18 includes a slit periodically formed on the encoder sheet 18. The carriage 11 includes a reading sensor that reads the slit in the encoder sheet 18. Thus, the printer 1 can detect a position of the carriage 11 in the main scanning direction X from a reading result of the reading sensor.

The printer 1 includes a controller board 50 that controls the head 10 to discharge an ink as a liquid from the head 10 at a timing when the carriage 11 is moved to a discharge position. A position of the carriage 11 is obtained from the reading result of the reading sensor of the carriage 11.

The printer 1 includes four heads 10 mounted on the carriage 11. Each heads 10 includes two rows of nozzle arrays on a nozzle surface 10*a* (see FIG. 4) of the head 10. Each nozzle arrays includes nozzles from which a liquid is discharged. The carriage 11 also mounts a sub tank that temporally stores a liquid to be supplied to the head 10. A liquid of desired color is supplied from the main tank 21 to the sub tank via the supply tube by the liquid feed pump.

The printer 1 includes a platen 40 as a holder to hold a fabric 400 as a print target. The printer 1 includes an elevator 41 on which the platen 40 is mounted. A position (height) of the elevator 41 is adjustable in a vertical direction indicated by arrow "Z." The printer 1 includes a slider 42 on which the elevator 41 is mounted. The printer 1 includes a slider rail 43 on which the slider 42 is movably mounted. The slider 42 is extended along on a sub-scanning direction indicated by arrow "Y" The sub-scanning direction Y is perpendicular to the main scanning direction X. Thus, the slider 42 moves along the slider rail 43 in the sub-scanning direction Y A slider 42 is reciprocally movable in the sub-sub-scanning direction Y via the timing belt 45 by a sub-scan drive mechanism. Reciprocal movement of the slider 42 in the sub-scanning direction Y reciprocally moves the platen 40 in the sub-scanning direction Y.

The printer 1 includes a maintenance unit 60 to maintain and recover a discharge function the head 10. The maintenance unit 60 is disposed on one side (right-side in FIG. 1) of the printer 1 in the main scanning direction X. The maintenance unit 60 includes a suction cap 61 to cap the nozzle surface 10*a* of the head 10, a moisture-retention cap 62 to cap the nozzle surface 10*a* of the head 10 to keep moisture in the nozzles of the head 10, and a wiper 63 to wipe the nozzle surface 10*a* of the head 10. The suction cap 61 is connected to a suction pump serving as a suction device.

The printer 1 includes a discharge receptacle 66 on another end of the printer 1 in the main scanning direction X. The controller board 50 controls the head 10 to discharge the liquid to the discharge receptacle 66 during printing to maintain and recover a discharge function of the head 10.

Further, the printer 1 includes a height detector 80 that includes a light emitter 80A and a light receiver 80B respectively disposed on one end (left end in FIG. 1) and on another end (right end in FIG. 1) of the printer 1 in the main scanning direction X. The height detector 80 detects a height of the fabric 400 on the platen 40. The height detector 80 is attached to a frame 2 of the printer 1.

The printer 1 may include a distance measuring sensor on an upper part of the platen 40 to detect the height of the fabric 400.

Further, the printer 1 includes a power button 70, an operation part 71, a power supply unit 72, and the like.

When the printer 1 prints on a cloth (print target) such as a T-shirt, the fabric 400 is set on the platen 40. Then, the operation part 71 is operated to completely pulls the platen 40 in a rear direction of the printer 1 via the slider 42.

When the platen 40 is taken into the printer 1, the printer 1 detects whether the fabric 400 on the platen 40 interferes with the head 10 using the height detector 80. When the printer 1 determines that the head 10 interferes (collides) with the fabric 400 by the height detector 80, the printer 1 stops pulling of the platen 40 inside the printer 1 or moves the platen 40 back to a set position of the platen 40 at which the fabric 400 is set on the platen 40.

When the platen 40 is fully (completely) pulled inside the printer 1 (end of pull-in operation), the printer 1 becomes a print-data standby state. The printer 1 starts a print operation when the printer 1 receives print data from an external information processing device. Alternatively, the printer 1 may select the print data by the operation part 71 to start the print operation when the print data is previously stored in the controller board 50.

The printer 1 controls the print operation from a print standby position such that the printer 1 may start the above-described printing, the printer may allow (permit) the printing, the printer 1 may moves to a next flow of printing, and the printer 1 may notify an operator that the printer 1 can start printing.

When the printer 1 starts the print operation, the printer 1 moves the slider 42 to move the platen 40 to a printing start position at which the printer 1 starts the print operation. Then, the printer 1 moves the carriage 11 while discharging a liquid from the head 10 to perform one line of printing on the fabric 400. When the printer 1 prints one line, the printer 1 moves the slider 42 to move the platen 40 by one line. The printer 1 intermittently repeats one scanning movement of the carriage 11 in the main scanning direction X and one movement of the slider 42 in the sub-scanning direction Y to print an image on a desired region on the fabric 400. The printer 1 moves the platen 40 back to a front side (left side in FIG. 1) of the printer 1 to finish the print operation.

Next, the height detector 80 according to the first embodiment of the present disclosure is described with reference to FIG. 4.

Figure 4:
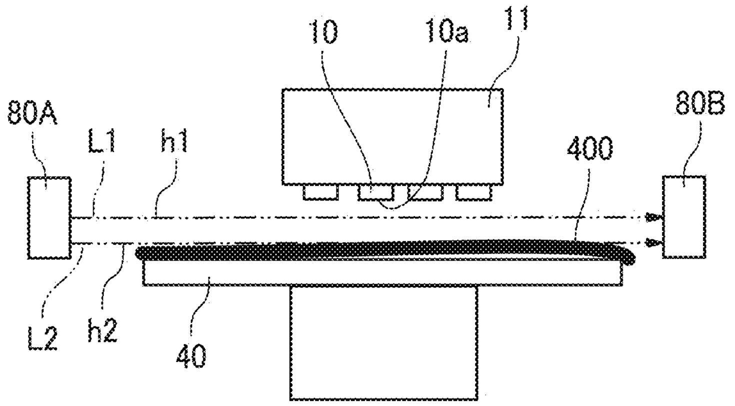
FIG. 4 is a schematic cross-sectional front view of a height detector according to the first embodiment of the present disclosure.

FIG. 4 is a schematic cross-sectional front view of the height detector 80.

Figure 12:
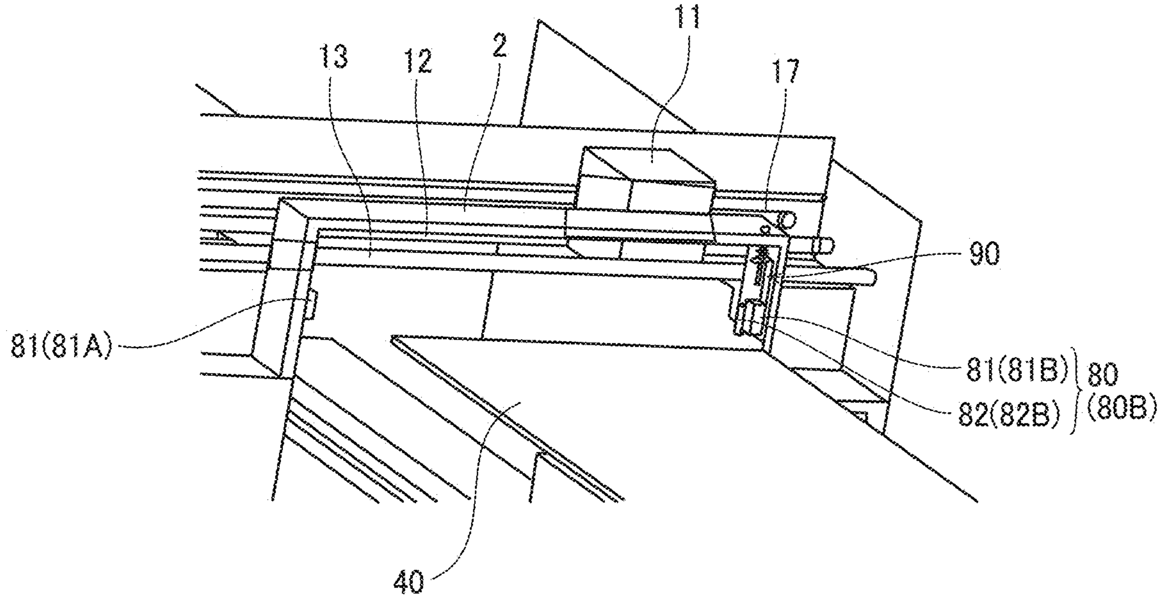
FIG. 12 is a schematic perspective view of a main portion of a height adjustment mechanism of the height detector according to a fourth embodiment of the present disclosure.

The height detector 80 includes a first detector 81 and a second detector 82 (see FIGS. 1 and 12). The first detector 81 detects the fabric 400 as a print target at a first height h1. The second detector 82 detects the fabric 400 as the print target at a second height h2 lower than the first height h1.

The first detector 81 includes a light emitter 81A and a light receiver 81B. The light emitter 81A emits an irradiation light L1 at the first height h1. The light receiver 81B receives the irradiation light L1 at the first height h1. When the irradiation light L1 is incident on the light receiver 81B, the fabric 400 is not detected at the first height h1. When the irradiation light L1 is not incident on the light receiver 81B, the fabric 400 is detected at the first height h1.

The second detector 82 includes a light emitter 82A and a light receiver 82B. The light emitter 82A emits an emission light L2 at the second height h2. The light receiver 82B receives the emission light L2 at the second height h2. When the emission light L2 is incident on the light receiver 82B, the printer 1 does not detect the fabric 400 at the second height h2 by the second detector 82. When the emission light L2 is not incident on the light receiver 82B, the printer 1 detects the fabric 400 at the second height h2 by the second detector 82.

The light emitter 81A of the first detector 81 and the light emitter 82A of the second detector 82 are combined to form the light emitter 80A of the height detector 80. The light receiver 81B of the first detector 81 and the light receiver 82B of the second detector 82 are combined to form the light receiver 80B of the height detector 80.

Here, the first height h1 is a height at which the nozzle surface 10*a* of the head 10 does not come into contact with the fabric 400 as the print target. The second height h2 is a height at which a gap (distance) between the nozzle surface 10*a* (discharge surface) of the head 10 and an upper surface of the fabric 400 is within a predetermined gap (distance).

An amount of mist of the liquid generated during a discharging operation of the liquid from the head 10 becomes within an allowable range (predetermined range) in the predetermined gap (distance). Both the first height h1 and the second height h2 are located between the nozzle surface 10*a* of the head 10 and the platen 40.

When the height detector 80 detects the height (surface height) of the fabric 400, the printer 1 moves the platen 40 in the sub-scanning direction Y to scan a predetermined area of the fabric 400. The predetermined area includes a part or an entire area of the print target.

Next, a height detection operation and a detection result of the height detector 80 is described with reference to FIGS. 5 and 6.

Figure 5:
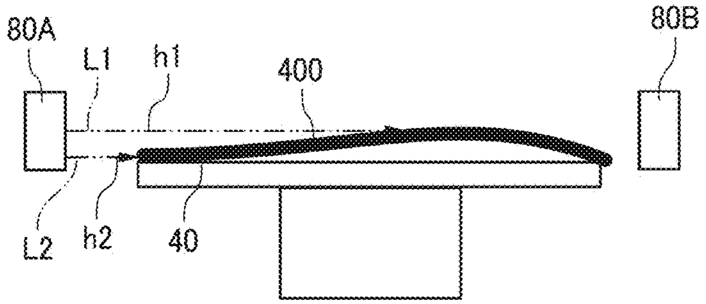
FIG. 5 is a schematic cross-sectional front view of the height detector illustrating a height detection operation and a detection result of the height detector.
Figure 6:
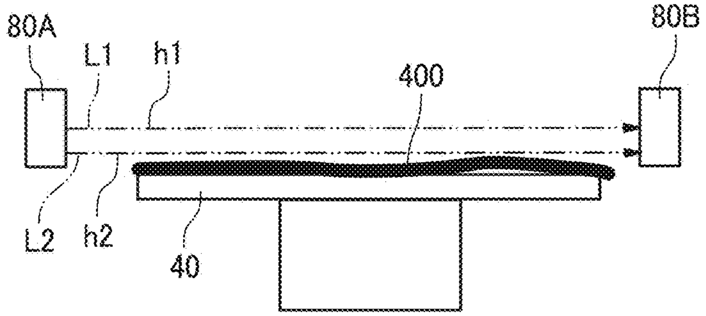
FIG. 6 is a schematic front view of the printer illustrating the height detection operation and the detection result of the height detector.

FIGS. 5 and 6 are schematic front view of the printer 1 illustrating the height detection operation and the detection result of the height detector 80.

In an example illustrated in FIG. 4, the emission light L2 at the second height h2 is blocked by the fabric 400, and the emission light L1 at the first height h1 is not blocked by the fabric 400. Thus, the printer 1 can determine that the height (surface height) of the fabric 400 is higher than the second height h2 and lower than the second height h1.

The surface height of the fabric 400 in FIG. 4 is at a height at which the head 10 does not interfere (contact) with the fabric 400 and the amount of mist generated during the discharge operation of the liquid is within the allowable range (predetermined range). That is, if the surface height of the fabric 400 is higher than the second height h2 and lower than the first height h1, the head 10 does not contact with the fabric 400 during the print operation so that the printer 1 can prevent scattering of the mist generated by discharging the liquid from the head 10. Thus, the printer 1 performs the print operation in the above-described state.

In an example illustrated in FIG. 5, both the emission light L2 at the second height h2 and the emission light L1 at the first height h1 are blocked by the fabric 400. Thus, the printer 1 can determine that the height (surface height) of the fabric 400 is higher than the first height h1.

Thus, the surface height of the fabric 400 is a height at which the head 10 contact (interfere) with the fabric 400. Thus, the printer 1 cannot move the head 10 to perform the print operation.

In an example illustrated in FIG. 6, both the emission light L2 at the second height h2 and the emission light L1 at the first height h1 are not blocked by the fabric 400. Thus, the printer 1 can determine that the height (surface height) of the fabric 400 is lower than the second height h2.

The surface height of the fabric 400 in FIG. 6 is so low so that the gap (distance) between the head 10 and the fabric 400 exceeds the allowable range (predetermined range) of the mist. Thus, the liquid discharged from the head 10 is finely scattered to generate a large amount of mist when the print operation is performed. Thus, the encoder sheet 18 and the reading sensor may be soiled with the generated mist that hinders an accurate detection of a carriage position and leads to a malfunction of the device. Thus, the printer 1 also cannot perform the print operation in the above-described state.

Figure 7:
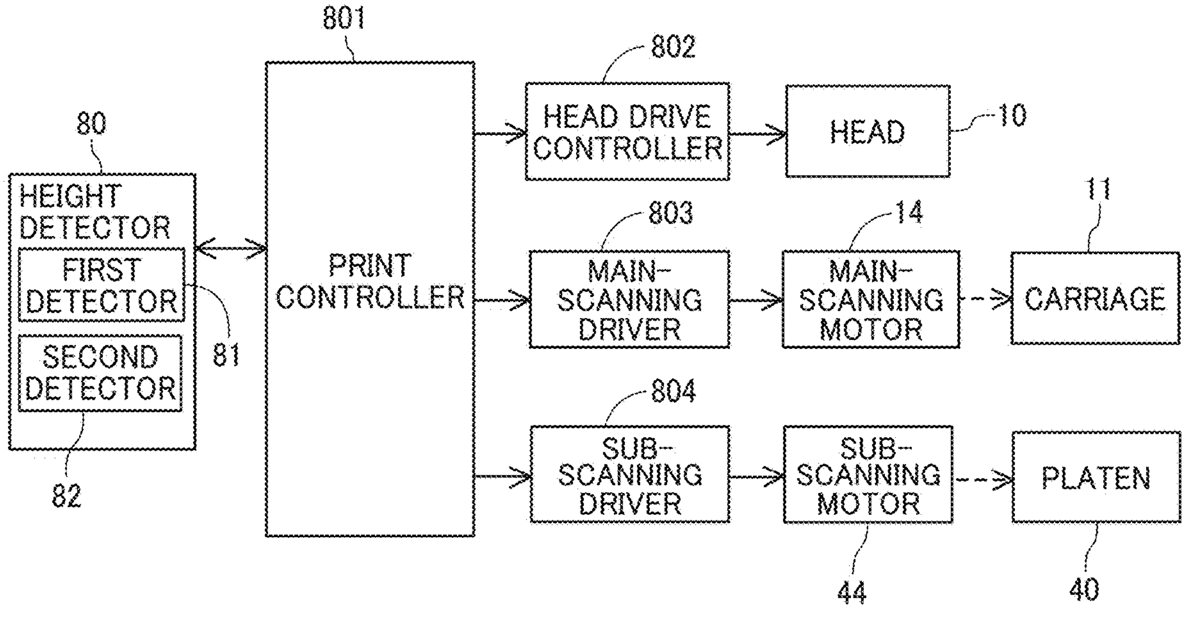
FIG. 7 is a block diagram of a part related to a control of the height detector and a print operation according to the first embodiment of the present disclosure.

FIG. 7 is a block diagram of a part related to a control of the height detector 80 and the print operation according to the first embodiment of the present disclosure.

The print controller 801 (circuitry) drives and controls the head 10 via the head drive controller 802. The print controller 801 drives the main-scanning motor 14 via the main-scanning driver 803 to reciprocally move the carriage 11 in the main scanning direction X. The print controller 801 drives the sub-scanning motor 44 via the sub-scanning driver 804 (driver) to reciprocally move the platen 40 in the sub-scanning direction Y The sub-scanning driver 804 (driver) serves as a driver to reciprocally move the platen 40 relative to the height detector 80 in the sub-scanning direction Y The sub-scanning driver 804 (driver) may moves the height detector 80 relative to the platen 40 instead of moving the platen 40 relative to the height detector 80.

The print controller 801 inputs each of the detection result of the first detector 81 and the second detector 82 of the height detector 80 and determines whether the height detector 80 detects the fabric 400 on the platen 40 at the first height h1 and the second height h2 with a movement of the platen 40 (holder).

The print controller 801 drives the sub-scanning motor 44 via the sub-scanning driver 804 to move the platen 40 in the sub-scanning direction Y while inputting each of the detection result of the first detector 81 and the second detector 82 of the height detector 80 to determine whether the height detector 80 detects the fabric 400 at the first height h1 and the second height h2 to detect the surface height of the fabric 400 on the platen 40.

Thus, the print controller 801 (circuitry) is configured to control the platen 40 (holder) and the height detector 80 to scanning the height detector 80 in the sub-scanning direction Y to perform the detection process of the height of the fabric 400 (print target).

The print controller 801 controls (performs) the print operation on the fabric 400 when the height detector 80 detects the fabric 400 at the second height h2 and does not detect the fabric 400 at the first height h1.

Figure 8:
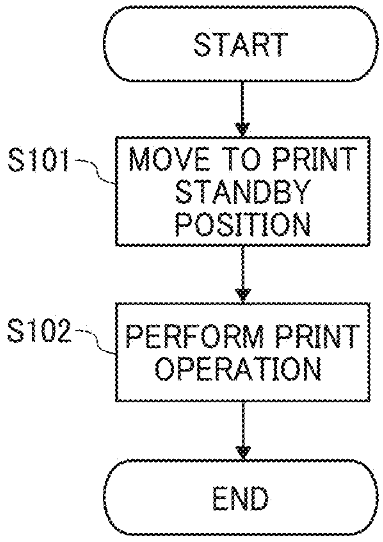
FIG. 8 is a flowchart illustrating the control of the printing operation of a print controller according to the first embodiment of the present disclosure.

FIG. 8 is a flowchart of a control process of the print operation of the print controller 801 according to the first embodiment of the present disclosure.

The print controller 801 moves the platen 40 onto which the fabric 400 is set to a pull-in position (which is also a print standby position) at a rear side of the printer 1 (step S101). The rear side of the printer 1 is a right side in FIG. 1. Hereinafter, the step S101 is simply referred to as "S101".

Then, the printer 1 starts the print operation (S102).

Figure 9:
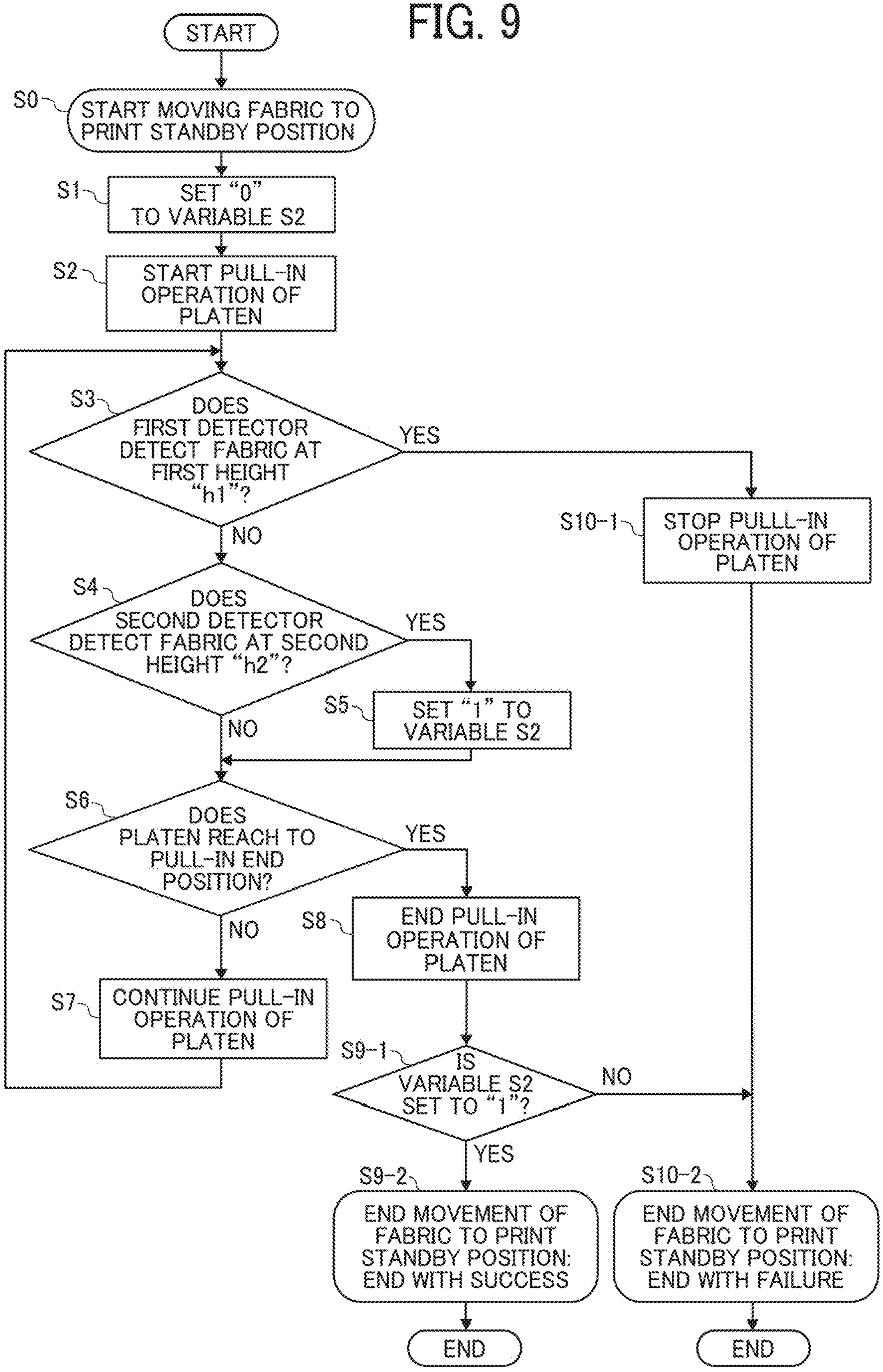
FIG. 9 is a flowchart of a control process of the print controller to move a fabric (platen) to a print standby position including a control of the height detector according to the first embodiment.

FIG. 9 is a flowchart of a control process of the print controller 801 to move the fabric 400 (platen 40) to the print standby position including a control of the height detector 80.

In step S0, the print controller 801 starts the control process to move the fabric 400 (platen 40) to the print standby position including the control of the height detector 80 according to the first embodiment of the present disclosure as illustrated in the flowchart in FIG. 9.

Then, the print controller 801 sets "0" in a variable S2 (S1). Note that the step S1 is simply referred to as "S1".

Next, the print controller 801 starts a pull-in operation that moves the platen 40 on which the fabric 400 is set to the rear side of the printer (S2).

Then, the print controller 801 determines whether the first detector 81 detects the fabric 400 at the first height h1 (S3).

At step S2, if the first detector 81 does not detect the fabric 400 at the first height h1 (S3, NO), the print controller 801 determines whether the second detector 82 detects the fabric 400 at the second height h2 (S4).

If the second detector 82 detects the fabric 400 at the second height h2 (S4, YES), the print controller 801 sets "1" to the variable S2 (S5).

Then, the print controller 801 determines whether the platen 40 reaches a pull-in end position (printing standby position) if the second detector 82 does not detect the fabric 400 at the second height h2 (S6).

If the platen 40 does not reach the pull-in end position (print standby position), (S6, NO), the print controller 801 returns processes to step S3 to repeat the above-described processes.

Conversely, the print controller 801 ends a pull-in operation (S8) if the platen 40 reaches the pull-in end position (print standby position), (S6, YES).

Then, the print controller 801 determines whether the variable S2 is set to "1" (S9-1). If the variable S2 is set to "1" (S9-1, YES), the print controller 801 ends the control process as a movement of the fabric 400 to the print standby position is successful (S9-2). If the variable S2 is not set to "1" (S9-1, NO), the print controller 801 ends the control process as the movement of the fabric 400 to the print standby position is a failure (S10-2).

Conversely, if the first detector 81 detects the fabric 400 at the first height h1 (S3, YES), the print controller 801 ends a pull-in operation of the platen 40 (S10-1) and ends the control process as the movement of the fabric 400 to the print standby position is the failure (S10-2).

That is, if the height detector 80 detects the fabric 400 at the first height h1 (S3, YES), the print controller 801 ends the control process (detection operation) as the failure since the head 10 may contact the fabric 400.

Further, if the platen 40 reaches to the print standby position (pull-in end position) while the height detector 80 cannot detect the fabric 400 at each of the first height h1 and the second height h2, the print controller 801 ends the control process (detection operation) as the failure since the gap (distance) between the head 10 and the fabric is larger than specified (predetermined) value.

If the gap (distance) between the head 10 and the fabric is larger than specified (predetermined) value, problems may occur such as generation of a large amount of mist during the print operation.

Conversely, the print controller 801 determines that the gap (distance) between the head 10 and the fabric 400 is appropriate and the control process (detection operation) is successful if the height detector 80 does not detect the fabric 400 at the first height h1 and detects the fabric 400 at the second height h2.

The print controller 801 controls a height detection of the fabric 400 by moving the platen 40 to the print standby position and performs the height detection by scanning the height detector 80 over an entire area in the sub-scanning direction Y of the platen 40 to effectively prevent contact between the head 10 and the fabric 400 and to effectively prevent generation of a large amount of mist.

Figure 10:
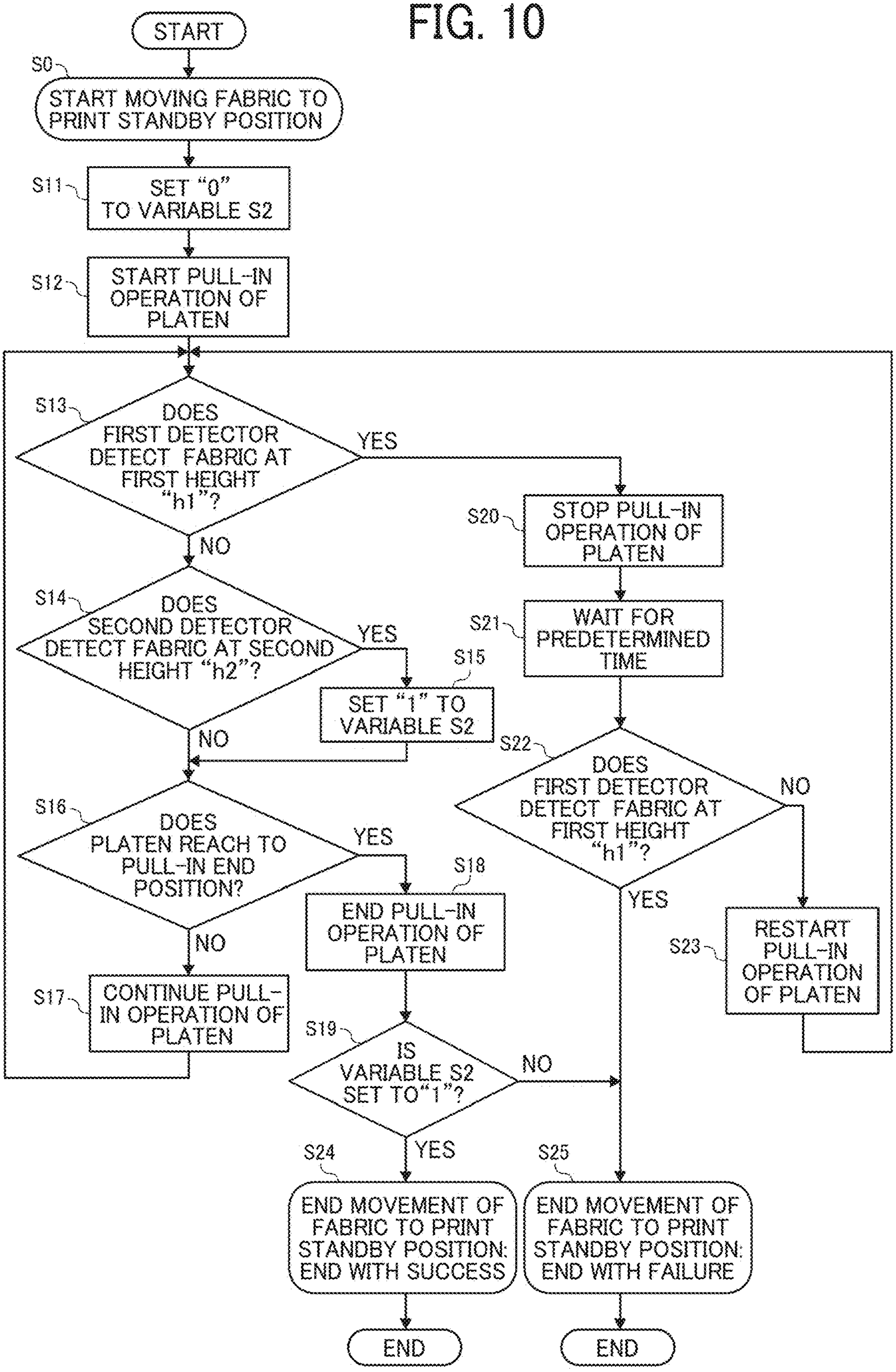
FIG. 10 is a flowchart of a control process of the print controller to move a fabric (platen) to a print standby position including a control of the height detector according to a second embodiment of the present disclosure.

FIG. 10 is a flowchart of a control of the print controller 801 to move the fabric 400 (platen 40) to the print standby position including a control of the height detector 80 according to a second embodiment of the present disclosure.

First, since steps S11 to S19 according to the second embodiment are respectively the same as the control processes of the steps S1 to S19 according to the first embodiment, the description thereof is omitted.

The print controller 801 according to the second embodiment temporarily stops the pull-in operation (relative movement) of the platen 40 (S20) if the first detector 81 detects the fabric 400 at the first height h1 in step S13 (S13, YES). Then, the print controller 801 waits for a predetermined time (S21). After an elapse of the predetermined time (S21), the print controller 801 determines again whether the first detector 81 detects the fabric 400 at the first height h1 at a stop position (detection position) at which the print controller 801 stops the pull-in operation of the platen 40 (S22).

The print controller 801 restarts the pull-in operation of the platen 40 (S23) and returns to step S13 to continue the detection operation (restart the detection operation) if the first detector 81 does not detect the fabric 400 at the first height h1 (S22, NO).

Conversely, if the first detector 81 detects the fabric 400 at the first height h1 (S22, YES), the print controller 801 ends the control process as the movement of the fabric 400 to the print standby position is the failure (S25).

That is, when the print controller 801 moves the platen 40 in the sub-scanning direction Y to perform the pull-in operation, the platen 40 may generate minute vibrations. When the platen 40 vibrates, the fabric 400 mounted on the platen 40 also vibrates. Thus, if the surface height of the fabric 400 is near a detection limit of the first height h1 by the height detector 80, the print controller 801 may detect the fabric 400 at the first height h1 due to a fluctuation of the height due to a vibration of the fabric 400.

Therefore, if the height detector 80 detects the fabric 400 at the first height h1, the print controller 801 temporarily stops the movement of the platen 40 and waits for a predetermined time until the vibration is settled (S21). Then, after an elapse of the predetermined time, the print controller 801 determines again whether the height detector 80 detects the fabric 400 at the first height h1 (S22).

The print controller 801 restarts the pull-in operation of the platen 40 (S23) and returns to step S13 to continue the detection operation if the first detector 81 does not detect the fabric 400 at the first height h1 (S22, NO).

Thus, the printer 1 can avoid an influence of the vibration of the platen 40 to accurately perform the detection operation so that the printer 1 does not unnecessarily perform the printing operation.

If the second detector 82 of the height detector 80 detects the fabric 400 at the second height h2 (S14, YES), the print controller 801 does not detects the fabric 400 again. However, the print controller 801 may detect the fabric 400 at the second height h2 again similarly to the above-described step S23.

Figure 11:
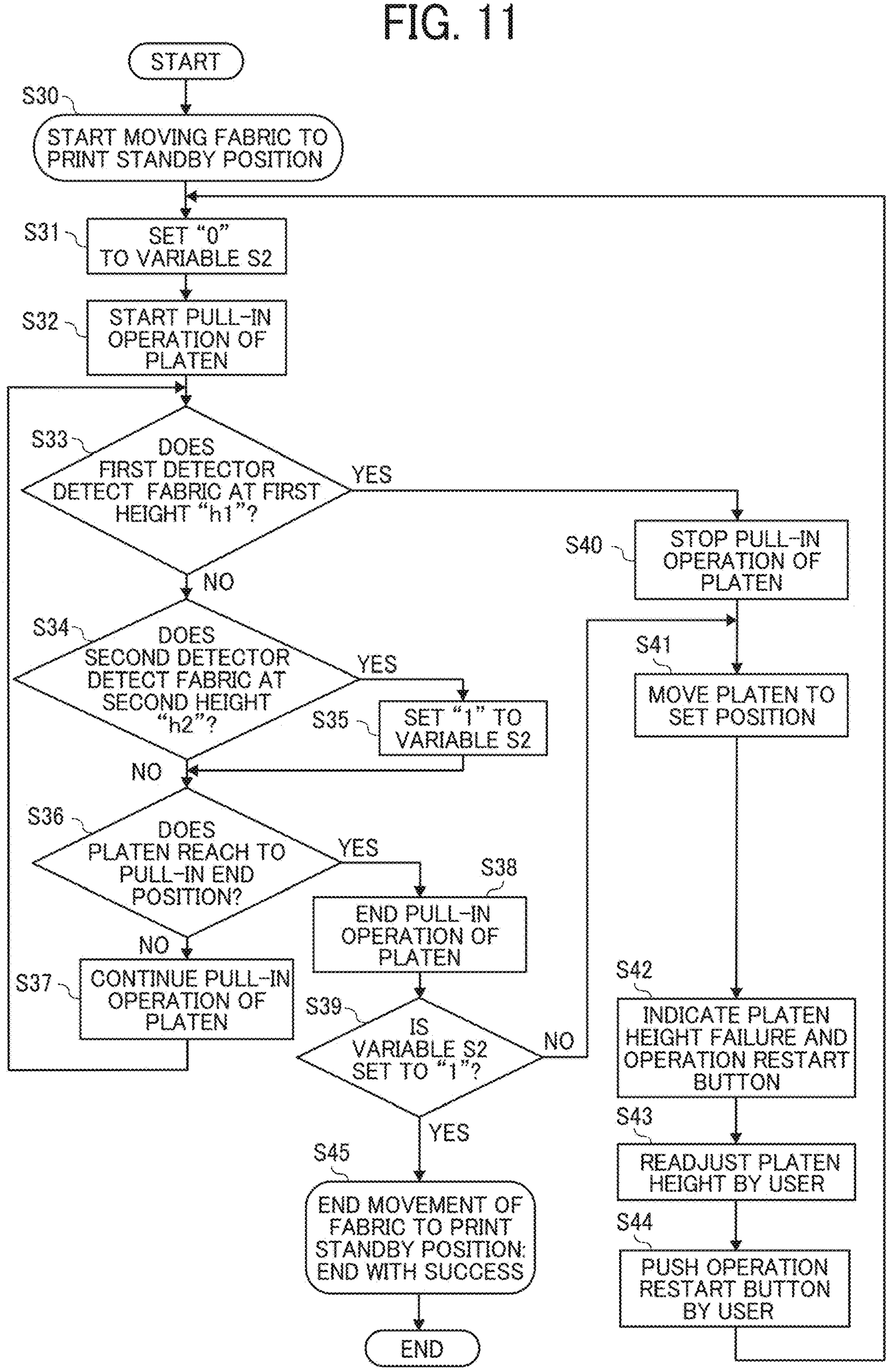
FIG. 11 is a flowchart of a control process of the print controller to move a fabric (platen) to a print standby position including a control of the height detector according to a third embodiment of the present disclosure.

FIG. 11 is a flowchart of a control of the print controller 801 to move the fabric 400 (platen 40) to the print standby position including a control of the height detector 80 according to a third embodiment of the present disclosure.

First, since steps S31 to S39 according to the third embodiment are respectively the same as the control processes of the steps S1 to S19 according to the first embodiment, the description thereof is omitted.

The print controller 801 according to the third embodiment temporarily stops the pull-in operation of the platen 40

(S40) if the first detector 81 detects the fabric 400 at the first height h1 in step S33 (S33, YES). Further, the print controller 801 moves and returns the platen 40 to the set position (initial position) at which the fabric 400 is set (S41).

Then, an error (failure) in the platen height is displayed (indicated) on the operation part 71, and the operation restart button 73 (restart button) is also displayed (S42). The operation restart button 73 instructs the user to restart the control process (detection operation) after adjusting the height of the platen 40 is also displayed (S42).

Thus, the user can press the restart button 73 restart detection of the of the fabric 400 (print target) Then, the user readjusts the height of the platen 40 (S43). When the user presses an operation restart button 73 (S44), the print controller 801 proceeds the control process to step S31 to restart the detection operation from the beginning.

Further, if the variable S2 is not "i" in step S39 (S39, NO), the print controller 801 proceeds the control process to step S41 to readjust the height of the platen 40.

Thus, the print controller 801 can adjust the height of the platen 40 and restarts the detection operation if the height of the fabric 400 is too high. Here, the print controller 801 also restarts the detection operation if the fabric 400 is reset on the platen 40 and the operation restart button 73 is pressed (attached).

The printer 1 may include a cancel button to instruct cancellation of the detection operation. Thus, the user can cancel the detection operation and restart the detection operation from the beginning by pressing the cancel button.

Next, the printer 1 according to a fourth embodiment of the present disclosure is described with reference to FIGS. 12 to 14.

FIG. 12 is a schematic perspective view of a main portion of a height adjustment mechanism 90 of the height detector 80 according to the fourth embodiment of the present disclosure.

Figure 13:
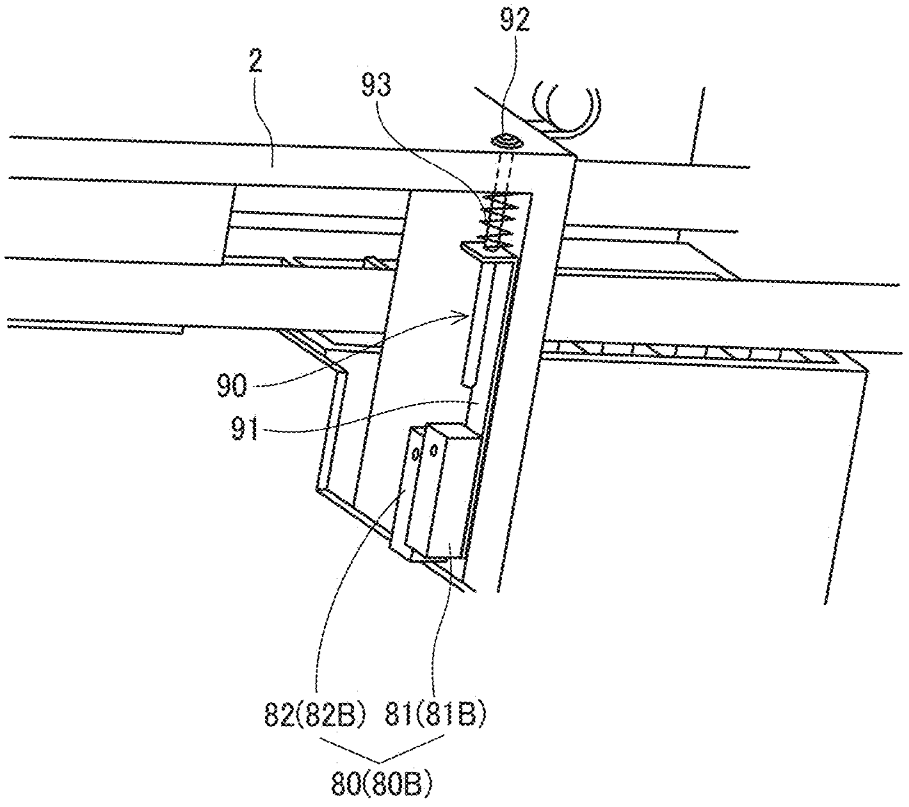
FIG. 13 is an enlarged perspective view of a portion of the height adjustment mechanism of the height detector according to the fourth embodiment.

FIG. 13 is a schematic enlarged perspective view of a portion of the height detector 80 of FIG. 12.

Figure 14:
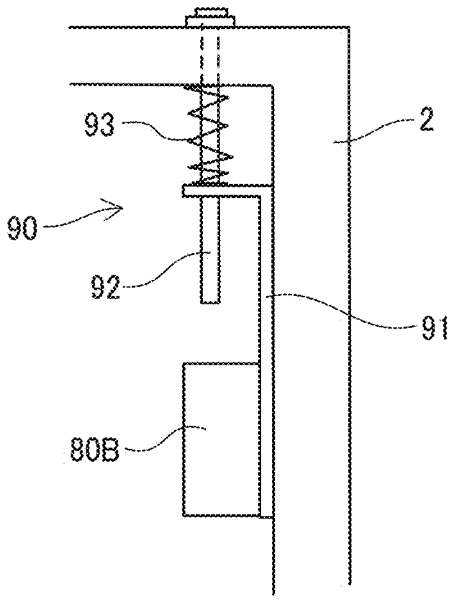
FIG. 14 is an enlarged cross-sectional front view of the height adjustment mechanism of FIG. 12.

FIG. 14 is a schematic cross-sectional front view of the height detector 80 of FIG. 12.

The height detector 80 includes a first detector 81 and a second detector 82. The first detector 81 detects the fabric 400 as a print target at a first height h1. The second detector 82 detects the fabric 400 as the print target at a second height h2.

The first detector 81 includes a light emitter 81A that emits an emission light in the main scanning direction X and a light receiver 81B that receives the emission light. Similarly, the second detector 82 includes a light emitter 82A that emits an emission light in the main scanning direction X and a light receiver 82B that receives the emission light.

The printer 1 includes the height adjustment mechanism 90 to adjust the height of the light receiver 81B of the first detector 81. The height adjustment mechanism 90 includes an L-shaped bracket 91 to which the light receiver 81B is attached. The height adjustment mechanism 90 includes an adjustment screw 92 hung from a frame 2 of an apparatus body of the printer 1.

The adjustment screw 92 can adjust the height of the L-shaped bracket 91. The height adjustment mechanism 90 includes a spring 93 to apply a pressure between the adjustment screw 92 and the L-shaped bracket 91 to always maintaining a specified distance by the adjustment screw 92. The printer 1 also includes the height adjustment mechanism 90 in the light emitter 81A of the first detector 81.

Since the fabric 400 has various thicknesses, the printer 1 cannot adjust the height of the height detector 80 for a thick fabric 400 if the first height h1 is fixed. Thus, the printer 1 includes the height adjustment mechanism 90 as a height adjuster to adjust the height of the first detector 81 so that the printer 1 can change the first height h1 according to a change in the thickness of the fabric 400.

The printer 1 according to the fourth embodiment can change the first height h1 that is a height detected by the first detector 81. The printer 1 according to the fourth embodiment also can change the second height h2 that is a height detected by the second detector 82.

The printer 1 may independently adjust each height of the first detector 81 and the second detector 82. Alternatively, the printer 1 may collectively adjust the height of the first detector 81 and the height of the second detector 82 as a single unit.

Further, the height detector 80 may include a light emitter including a plurality of light emitting parts arranged in a row and a light receiver including a plurality of light receiving parts arranged in a row, for example. The printer 1 using such a height detector 80 can select the light emitter and the light receiver to be used so that the printer 1 can adjust (change) the first height h1 and the second height h2. That is, the height detector 80 is not limited to a height detector that includes a first detector and a second detector separated from the first detector.

The holder is a tray in the above embodiments, however, the holder may be a cassette detachable to the printer, for example.

Although the printer in the above-described embodiments prints on the fabric, an object to be printed is not limited to the fabric. Further, the printer according to the present embodiments may also be applied to a printer that sets an object to be printed other than a fabric on a holder to print an image on the object to be printed.

The term "liquid discharge apparatus" used herein also represents an apparatus including the head or the liquid discharge device to discharge liquid by driving the head. The liquid discharge apparatus may be, for example, an apparatus capable of discharging liquid to a material to which liquid can adhere or an apparatus to discharge liquid toward gas or into liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can be adhered" represents a material on which liquid is at least temporarily adhered, a material on which liquid is adhered and fixed, or a material into which liquid is adhered to permeate.

Examples of the "material on which liquid can be adhered" include recording media, such as paper sheet, recording paper, recording sheet of paper, film, and cloth, electronic component, such as electronic substrate and piezoelectric element, and media, such as powder layer, organ model, and testing cell.

The "material on which liquid can be adhered" includes any material on which liquid is adhered, unless particularly limited.

The above-mentioned "material onto which liquid can be adhered" may be any material as long as liquid can temporarily adhere such as paper, thread, fiber, cloth, leather, metal, plastic, glass, wood, ceramics, or the like.

The "liquid discharge apparatus" may be an apparatus to relatively move the head and a material on which liquid can be adhered. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat, with the treatment liquid, a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" used herein may be used synonymously with each other.

The printer according to the present embodiment is suitably used in a printer that discharges a liquid containing a pigment.

When a fabric is used as a print target, a liquid containing a pigment is preferably used because the liquid containing a pigment has less bleeding, good color development and light resistance, and a cleaning process after printing is not necessary.

However, the pigment is hard and may adhere to the nozzle surface and rub against the nozzle surface to damage the nozzle surface that may cause discharge failure.

Therefore, if pigment adheres to the nozzle surface due to mist or the like, the nozzle surface may be damaged during a subsequent cleaning operation of the nozzle surface. Further, the nozzle surface may be damaged by direct contact between the pigment adhering to the printed target and the nozzle surface.

Therefore, the printer 1 according to the present embodiments reduces generation of the mist and prevents the nozzle surface from contacting with the print target. Thus, the printer 1 is preferably used for a printing using a liquid (ink) containing a pigment.

Each of the functions of the described embodiments such as the functions of the print controller 801 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A printer comprising:

a liquid discharge head to discharge a liquid to a print target to print on the print target;

a holder onto which the print target is set and which moves in a first direction and a second direction opposite to the first direction;

a height detector to detect the print target on the holder at a first height and/or at a second height lower than the first height while the holder moves the print target from a print finish position at a front side of the printer toward a print standby position at a rear side of the printer in the first direction; and circuitry configured to:

control the holder to move from the print standby position at the rear side of the printer to the print finish position at the front side of the printer;

under a condition that the height detector detects the print target at the second height while the height detector does not detect the print target at the first height while the holder moves the print target from the print finish position at the front side of the printer toward the print standby position at the rear side of the printer in the first direction, control the liquid discharge head to print on the print target while the holder is moved between the print standby position and the print finish position;

under a condition that the height detector does not detect the print target at the first height and does not detect the print target at the second height while the holder moves the print target from the print finish position at the front side of the printer toward the print standby position at the rear side of the printer in the first direction, control the liquid discharge head not to print on the print target while the holder is moved between the print finish position and the print standby position; and under a condition that the height detector detects the print target at both the first height and the second height while the holder moves the print target from the print finish position at the front side of the printer toward the print standby position at the rear side of the printer in the first direction, control the holder to be temporarily stopped and the liquid discharge head not to print on the print target.

2. The printer according to claim 1, wherein a gap between the print target and a discharge surface of the liquid discharge head is within a predetermined range if the height detector detects the print target at the second height.

3. The printer according to claim 1, wherein the print target is a fabric.

4. The printer according to claim 1, wherein the liquid contains a pigment.

5. The printer according to claim 1, further comprising an elevator to move the holder in a vertical direction.

6. A method for controlling a printer comprising:

discharging a liquid to a print target;

holding the print target on a holder;

moving the holder in a first direction and/or a second direction opposite to the first direction;

detect the print target on the holder at a first height and/or at a second height lower than the first height while the holder moves the print target from a print finish position at a front side of the printer toward a print standby position at a rear side of the printer in the first direction;

under a condition that the height detector detects the print target at the second height while the height detector does not detect the print target at the first height while the holder moves the print target from the print finish position at the front side of the printer toward the print standby position at the rear side of the printer in the first direction, controlling the liquid discharge head to print on the print target while the holder is moved between the print standby position and the print finish position;

under a condition that the height detector does not detect the print target at the first height and does not detect the print target at the second height while the holder moves the print target from the print finish position at the front side of the printer toward the print standby position at the rear side of the printer in the first direction, controlling the liquid discharge head not to print on the print target while the holder is moved between the print finish position and the print standby position; and under a condition that the height detector detects the print target at both the first height and the second height while the holder moves the print target from the print finish position at the front side of the printer toward the print standby position at the rear side of the printer in the first direction, controlling the holder to be temporarily stopped and the liquid discharge head not to print on the print target.

7. The method according to claim 6, wherein a gap between the print target and a discharge surface of the liquid discharge head is within a predetermined range if the height detector detects the print target at the second height.

8. The method according to claim 6, wherein the print target is a fabric.

9. The method according to claim 6, wherein the liquid contains a pigment.

10. The method according to claim 6, further comprising moving the holder in a vertical direction by an elevator.

* * * * *